United States Patent
Davis

(10) Patent No.: US 9,003,090 B1
(45) Date of Patent: Apr. 7, 2015

(54) PCI EXPRESS FABRIC ROUTING FOR A FULLY-CONNECTED MESH TOPOLOGY

(71) Applicant: Jeffrey Benjamin Davis, Menlo Park, CA (US)

(72) Inventor: Jeffrey Benjamin Davis, Menlo Park, CA (US)

(73) Assignee: DSSD, Inc., Menlo Park, CA (US)

( * ) Notice: Subject to any disclaimer, the term of this patent is extended or adjusted under 35 U.S.C. 154(b) by 0 days.

(21) Appl. No.: 14/224,846

(22) Filed: Mar. 25, 2014

(51) Int. Cl.
*G06F 13/42* (2006.01)

(52) U.S. Cl.
CPC .................................... *G06F 13/42* (2013.01)

(58) Field of Classification Search
USPC .................. 710/105, 305–306, 316–317, 100
See application file for complete search history.

(56) References Cited

U.S. PATENT DOCUMENTS

| | | | |
|---|---|---|---|
| 7,502,878 B1* | 3/2009 | Wright | 710/37 |
| 2008/0016265 A1* | 1/2008 | Oshikiri et al. | 710/309 |
| 2011/0283037 A1* | 11/2011 | Koga et al. | 710/313 |

OTHER PUBLICATIONS

Budruk, R.; "PCI Express Basics;" PCI-SIG; 2007 (40 pages).
Percival, D., "Multicast Over PCI Express;" PCI-SIG; 2009 (33 pages).

* cited by examiner

*Primary Examiner* — Tim T. Vo
*Assistant Examiner* — Kim T. Huynh
(74) *Attorney, Agent, or Firm* — Osha • Liang LLP

(57) ABSTRACT

A PCIe Fabric that includes an IO tier switch, hub tier switches, and a target device connected to one of the hub tier switches. The IO tier switch is configured to receive a TLP from a client, make a determination that an address in the TLP is not associated with any multicast address range in the first IO tier switch and is not associated with any downstream port in the first IO tier switch, and, based on the determinations, route the TLP to the first hub tier switch via a upstream port on the IO tier switch. The hub tier switch is configured to make a determination that the TLP is associated with a multicast group, and, based on the determination, generate a rewritten TLP and route the rewritten TLP to a target device via a downstream port on the hub tier switch.

25 Claims, 7 Drawing Sheets

PCI EXPRESS FABRIC ROUTING FOR A FULLY-CONNECTED MESH TOPOLOGY

BACKGROUND

In order for two systems to enable two independent systems to communicate, each of the systems needs to include sufficient hardware and/or software to enable the two systems to interface.

SUMMARY

In general, in one aspect, the invention relates to a PCIe Fabric that includes an Input/Output (I/O) tier comprising a first IO tier switch and a second IO tier switch, a hub tier comprising a plurality of hub tier switches, wherein the plurality of hub tier switches comprises a first hub tier switch and a second hub tier switch, wherein the first IO tier switch is connected to the first hub tier switch using a first link, wherein the first IO tier switch is connected to second hub tier switch using a crosslink. The PCIe fabric further includes a plurality of target devices, wherein each of the plurality of target devices is connected to one of the plurality of hub tier switches, wherein the first hub tier switch is connected to a first target device of the plurality of target devices using a second link, and wherein the first hub tier switch is connected to a second target device of the plurality of target devices using a third link. The first IO tier switch is configured to: receive, from a client, a transaction layer packet (TLP), make a first determination that an address in the TLP is not associated with any multicast address range in the first IO tier switch, make a second determination that the address in TLP is not associated with any downstream port in the first IO tier switch, based on the first and second determinations, route the TLP to the first hub tier switch using the first link via a first upstream port on the first IO tier switch. The first hub tier switch is configured to: receive, from the first IO tier switch, the TLP at a first downstream port, make a third determination that the TLP is associated with a first multicast group, based on the third determination: generate a first rewritten TLP and route the first rewritten TLP to the first target device using the second link via a second downstream port on the first hub tier switch, wherein the second downstream port is a subscriber of the first multicast group.

In general, in one aspect, the invention relates to a PCIe Fabric comprising: an Input/Output (I/O) tier comprising a first IO tier switch and a second IO tier switch, a hub tier comprising a plurality of hub tier switches, wherein the plurality of hub tier switches comprises a first hub tier switch and a second hub tier switch, wherein the first IO tier switch is connected to the first hub tier switch using a first link, wherein the first IO tier switch is connected to second hub tier switch using a crosslink, wherein the PCIe fabric is operatively connected to a plurality of target devices, wherein each of the plurality of target devices is connected to one of the plurality of hub tier switches, wherein the first hub tier switch is connected to a first target device of the plurality of target devices using a second link, and wherein the first hub tier switch is connected to a second target device of the plurality of target devices using a third link. The first IO tier switch is configured to: receive, from a client, a transaction layer packet (TLP), make a first determination that an address in the TLP is not associated with any multicast address range in the first IO tier switch, make a second determination that the address in TLP is not associated with any downstream port in the first IO tier switch, based on the first and second determinations, route the TLP to the first hub tier switch using the first link via a first upstream port on the first IO tier switch. The first hub tier switch is configured to: receive, from the first IO tier switch, the TLP at a first downstream port, make a third determination that the TLP is associated with a first multicast group, based on the third determination: generate a first rewritten TLP and route the first rewritten TLP to the first target device using the second link via a second downstream port on the first hub tier switch, wherein the second downstream port is a subscriber of the first multicast group.

Other aspects of the invention will be apparent from the following description and the appended claims.

DETAILED DESCRIPTION

Figure 1:
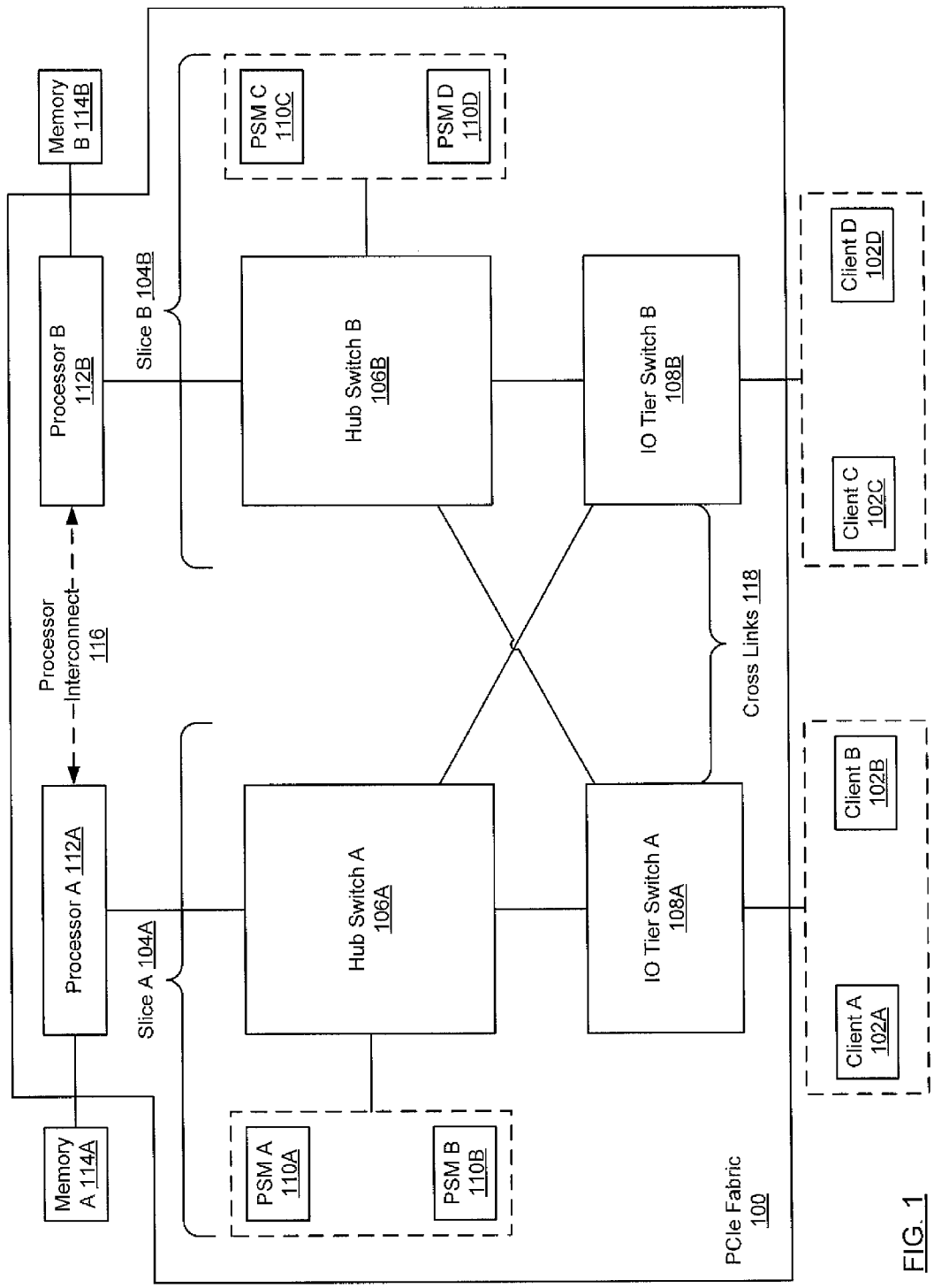
FIG. 1 shows a system that includes a PCIe Fabric in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to a PCIe fabric that includes at least two tiers of switches connected to form a fully-connected mesh topology between the at least two tiers. Further, embodiments of the invention relate to a PCIe fabric that enables clients connected to one slice in the PCIe fabric to perform operations (e.g., read and write operations) on memory, network endpoint devices, and/or persistent storage in a different slice of the PCIe fabric.

In a typical communication fabric (such as Ethernet or Infiniband), requests are routed across switches in the communication fabric by associating a unique endpoint address with each endpoint device, and specifying the endpoint address as part of the request. In a PCIe fabric, read and write operations are routed between fabric switches based on the memory address being accessed, rather than an endpoint address. As a result, the typical arrangement of address-based routing for a fully-connected mesh does not permit all clients to access all endpoint devices. One or more embodiments of the invention provide a mechanism by which this limitation can be overcome. Specifically, address-based routing may be used to achieve a fully-connected mesh between the tiers (described below) with all clients accessing all endpoints.

In one or more embodiments of the invention, the components in the PCIe fabric communicate and/or implement that Peripheral Component Interconnect Express (PCIe) standard. Embodiments of the invention are not limited to any past, current or future version of the PCIe standard. Further, embodiments of the invention may be implemented with other standards that implement features that are similar to the features of the PCIe standard that are used to implement various embodiments of the invention.

FIG. 1 shows a system that includes a PCIe Fabric in accordance with one or more embodiments of the invention. The PCIe Fabric (100) is made up of two or more slices (104A, 104B), where each of the slices is directly connected to a processor (112A, 112B) and one or more clients (102A-102D). Each of the aforementioned components is described below.

In one embodiment of the invention, each client (102A-102D) is a physical device that includes a processor (or another type of processing component), memory, and a physical interface(s) to enable it to connect to the PCIe fabric (100). Further, each client includes functionality to implement the PCIe standard (or portions thereof) that are required to implement one or more embodiments of the invention. The clients also include functionality to send and/or receive transaction layer packets (TLP). A TLP corresponds to a type of packet that is defined in accordance with the PCIe standard. In one embodiment of the invention, the TLPs enable clients to read from the PCIe fabric and write data to the PCIe fabric. Said another way, the TLPs enable clients to transfer data to and from locations in the PCIe fabric. In one embodiment of the invention, one or more of the clients operates as a PCIe endpoint, i.e., a device that originates a transaction and/or a device that is the target of the transaction. Each of the clients may be connected to PCIe fabric via a link, i.e., physical connection between the client and the PCIe fabric.

Continuing with the discussion of FIG. 1, each slice (104A, 104B) includes an Input/Output (10) tier switch (ITS) (108A, 108B), a hub tier switch (HTS) (106A, 106B), and one or more persistent storage modules (PSMs). Each of these components is described below.

With respect to the ITS, each ITS is a physical PCIe switch that is connected to one or more clients (102A-102D). Each ITS is also connected to a HTS in the same slice in which the ITS is located. In addition, each ITS may be connected to one or more HTSes in different slices than the one in which the ITS is located. In one embodiment of the invention, each ITS is connected to every HTS in the PCI fabric resulting in a fully connected mesh between the tiers in the PCIe fabric. Embodiments of the invention may be implemented without a fully connected mesh between the tiers without departing from the invention.

In one embodiment of the invention, each ITS is configured to: (i) receive TLPs from the clients with which it is connected and route the TLPs to the appropriate egress port (either the upstream port or one of the downstream ports) on the ITS using address routing and (ii) receive TLPs from one or more HTSes to which the ITS is connected and route the TLPs to the appropriate egress port (typically a downstream port) on the ITS using address routing. For example, in FIG. 1, ITS B (108B) may receive TLPs from Client C (102A), Client D (102D), HTS A (106A), and HTS B (106B). Additional details about the ITS are provided below with respect to FIG. 2.

With respect to the HTS, each HTS is a physical PCIe switch that is connected to one or more ITSes (108A-108B) and to one or more persistent storage modules (PSMs (110A-110D). Each HTS is connected to an ITS in the same slice in which the HTS is located. In addition, each HTS may be connected to zero or more ITSes in different slices than the one in which the HTS is located. In one embodiment of the invention, each HTS is connected to every other ITS in the PCIe fabric resulting in a fully connected mesh between the tiers in the PCIe fabric. Each HTS may also be connected to a processor via its root port (not shown). Embodiments of the invention may be implemented without a fully-connected mesh between the tiers without departing from the invention.

In one embodiment of the invention, each HTS is configured to: (i) receive TLPs from the persistent storage modules (PSM) with which it is connected and route the TLPs to the appropriate egress port (typically a downstream port) on the HTS using address routing and (ii) receive TLPs from one or more ITSes to which the HTS is connected and route the TLPs to the appropriate egress port (either the upstream port or one or more of the downstream ports) on the HTS using address routing. For example, in FIG. 1, HTS B (106B) may receive TLPs from PSM C (110C), PSM D (110D), ITS A (108A), and ITS B (108B). Additional details about the HTS are provided below with respect to FIG. 3.

In one embodiment of the invention, each of the persistent storage modules (100A-110D) includes persistent storage (not shown) and, optionally, volatile memory (not shown) (e.g., Dynamic Random-Access Memory (DRAM), Synchronous DRAM, SDR SDRAM, and DDR SDRAM). The persistent storage may include, but is not limited to, NAND Flash memory, NOR Flash memory, Magnetic RAM Memory (MRAM), Spin Torque Magnetic RAM Memory (ST-MRAM), Phase Change Memory (PCM), memristive memory, any other memory defined as non-volatile Storage Class Memory (SCM), magnetic disks, and optical disks. Those skilled in the art will appreciate that embodiments of the invention are not limited to storage class memory. In one embodiment of the invention, each of the PSMs is part of only one slice.

Continuing the discussion of the PCIe fabric, as discussed above, each slice in the PCIe fabric is directly connected to at least one processor (112A, 112B). Each processor is a group of electronic circuits with a single core that is configured to execute instructions or multiple cores that are configured to execute instructions. The processor may be implemented using a Complex Instruction Set (CISC) Architecture or a Reduced Instruction Set (RISC) Architecture. In one or more embodiments of the invention, the processor includes a root complex (as defined by the PCIe standard) (not shown). The root complex connects the processor to at least one slice and to memory (114A, 114B) (e.g., Dynamic Random-Access Memory (DRAM), Synchronous DRAM, SDR SDRAM, and DDR SDRAM) that is accessible via the PCIe fabric but that is not part of any slice in the PCIe fabric.

In one embodiment of the invention, processors (112A, 112B) within the PCIe fabric are able to directly communicate using, for example, a processor interconnect (116) such as Intel® QuickPath Interconnect. Those skilled in the art will appreciate that other point-to-point communication mechanisms may be used to permit direct communication between the processors (112A, 112B) without departing from the invention.

The invention is not limited to the system shown in FIG. 1.

While the FIG. 1 shows clients connected to the ITSes and PSMs connected to the HTSes, embodiments of the invention may be implemented such that clients are connected to the HTSes and PSMes are connected to the ITSes.

In another embodiment of the invention, the PCIe fabric may be implemented such that it does not include any PSMs; rather, both the ITSes and the HTSes are connected to separate sets of clients, wherein the PCIe fabric facilitates communication between the clients.

Further, while the PCIe fabric shown in FIG. 1 only includes two slices, two processors, and four PSMs, PCIe fabrics may be implemented with a fewer or greater number of each of the aforementioned components without departing from the invention. In addition, while the PCIe fabric in FIG. 1 is connected to four clients and two memories, embodiments of the invention may be implemented to enable the PCIe fabric to connect with a fewer or greater number of clients and/or memories without departing from the invention.

Further, while embodiments of the invention have been described with respect to a PCIe fabric that includes storage (e.g., PSM (110A-110D), embodiments of the invention may be implemented to enable any two devices to communicate using the PCIe fabric. For example, in one embodiment of the invention, the clients shown in FIG. 1 may be blade servers, where the blade servers do not include any physical NIC cards and PSMs may be replaced with network endpoint devices.

In this example, network endpoint devices are devices that are configured to interface with both a network (i.e., a wired network, a wireless network or a combination thereof) using a networking protocol and with the PCIe fabric via PCIe. An example of network endpoint device is a PICe NIC card. The network endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory).

Continuing with the example, the PCIe fabric would enable the blade servers to communicate with one or more network endpoint devices. This embodiment would allow the blade servers to efficiently share one or more network endpoint devices. The invention is not limited to this example.

In another example, in one or more embodiments of the invention, the PSMs may be replaced with storage endpoint devices (i.e., devices that include functionality to store data and the service read and write requests from clients). The storage endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory). An example of the storage endpoint device is a storage appliance. The invention is not limited to this example.

Further, embodiments of the invention may be extended to cover two or more devices communicating via a PCIe fabric. In the general case, the PSM (shown in FIG. 1) may be generalized to a target device, where the target device may include the PSM, a network endpoint device, a storage endpoint device, or any other device capable of communicating using PCIe.

While the PCIe Fabric in FIG. 1 has been shown as including the PSMs (or more generally target devices), the PCIe Fabric may be implemented such that it does not include the target devices; rather, the PCIe Fabric only include the necessary physical components to connect to the target devices.

Figure 2:
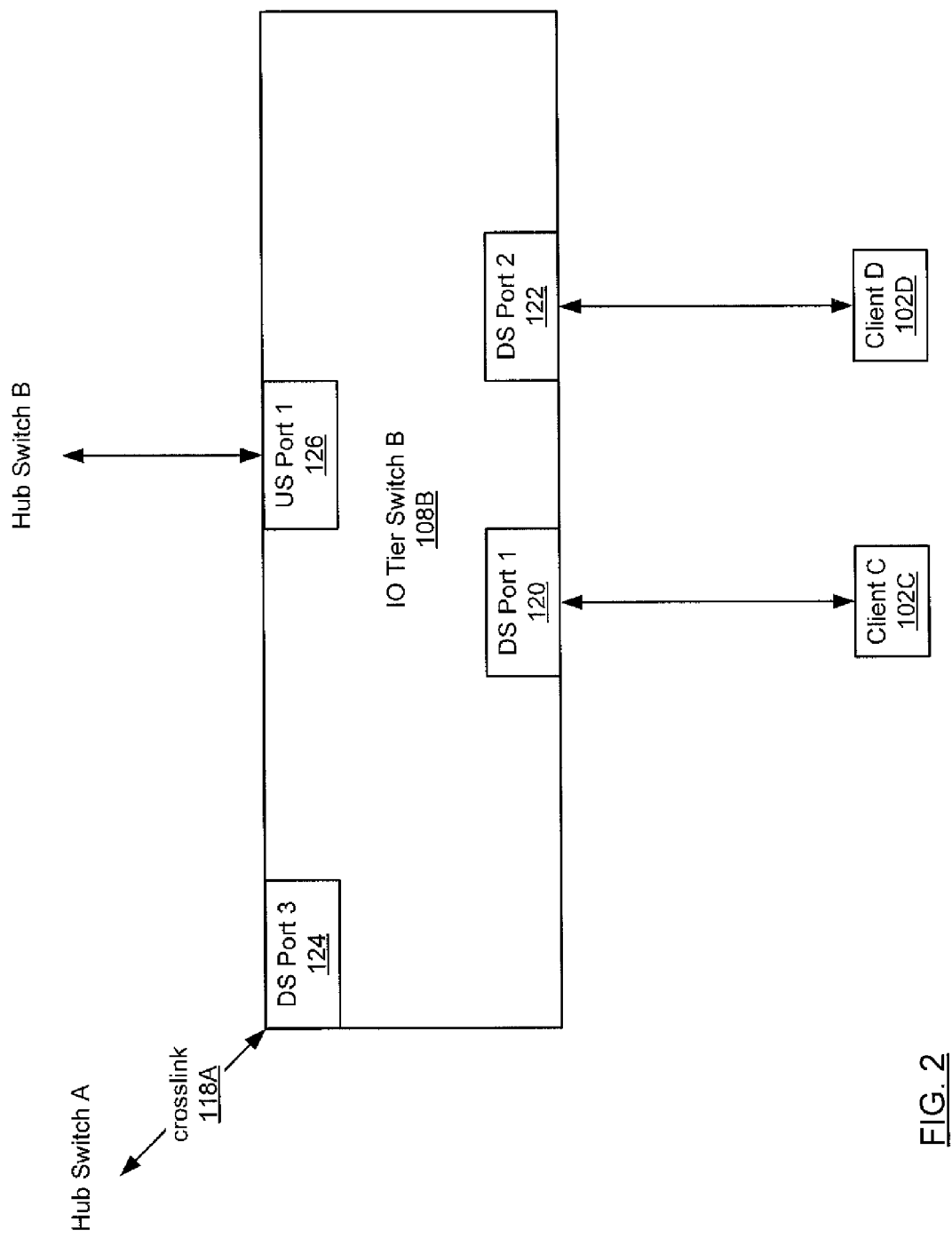
FIG. 2 shows an Input/Output (IO) tier switch in accordance with one or more embodiments of the invention.

FIG. 2 shows an Input/Output (IO) Tier (ITS) switch in accordance with one or more embodiments of the invention. The ITS (108B) includes one upstream (US) port (US Port 1 (126)) and one or more downstream (DS) ports (DS port 1 (120), DS port 2 (122)), DS port 3 (124)). In one embodiment of the invention, a port is designated as a US port if the port points towards the root complex (discussed above). Alternatively, a port is a designated as a DS port if the port points away from the root complex. In one embodiment a port (either downstream or upstream) is a physical interface between the ITS and a device (e.g., a client, a PCIe switch (e.g., a ITS or a HTS), etc.). The port connects to the device via a link (i.e., a physical connection). If the device is an a different slice than the ITS, then the link is referred to as a crosslink. Further, though shown as single ports in FIG. 2, each of the ports may operate as an egress port, when transmitting TLPs, and as an ingress port when receiving TLPs. Alternatively, the ports shown in FIG. 2 may instead each be implemented as two separate ports—namely, as an ingress port and an egress port.

Continuing with the discussion of FIG. 2, the US port (US Port 1 (126)) is connected, via a link, to a HTS in the same slice as the ITS. The US port (126) is also associated with an address range that includes the entire address range of all memory (including all persistent storage and volatile memory in the PSMs in the PCIe fabric) in all slices (104A, 104B in FIG. 1) in the PCIe fabric (100) and the memory (including all persistent storage and volatile memory) of all clients connected to the PCIe fabric. The aforementioned address range does not include the memory (114A, 114B) that is directly attached to the processors (112A, 112B). The aforementioned address range may be a contiguous address range or may be made up of a series of non-contiguous address ranges.

In one embodiment of the invention, at least one DS port (DS port 3 (124)) in the ITS is connected, via a crosslink (118A), to a HTS (e.g., hub tier switch A in FIG. 2) in a different slice (e.g., Slice A) and is associated with an address range that includes only the memory (including the persistent storage in the corresponding PSMs) associated with that slice (e.g., Slice A in FIG. 2) and the memory (including all persistent storage and volatile memory) of all clients connected to the ITS in that slice (e.g., Slice A in FIG. 2). The aforementioned address range may be a contiguous address range or may be made up of a series of non-contiguous address ranges. More generally, a DS port in an ITS in a first slice that is connected to a second slice via a crosslink in the PCIe fabric is associated with an address range that only includes the memory of the second slice to which it is connected. Depending on the implementation of the PCIe fabric, each ITS may have multiple DS ports, where one or more such DS ports is connected, via crosslink, to an HTS in a different slice. The ITS also includes DS ports connected to clients. In one embodiment of the invention, each of the DS ports (120, 122) that is connected to a client (e.g., client C, client D) is only associated with an address range for the client to which it is connected.

The ITS (108B) may also implement at least one multicast group. In one embodiment of the invention the multicast group is associated with a multicast address range, which may be distinct from (or be a subset of) the address range associated with the US port (US port 1 (126)). Further, the only subscriber to the at least one multicast group is the US port (US port 1 (126)).

Though not shown in FIG. 2, in one embodiment of the invention the ITS includes a crosslink between the ITS and an HTS in the same slice, where the crosslink is associated with an address range that includes the entire address range of all memory (including all persistent storage and volatile memory) in the PSMs in the slice. The aforementioned address range may be a contiguous address range or may be made up of a series of non-contiguous address ranges.

The invention is not limited to the system shown in FIG. 2.

Figure 3:
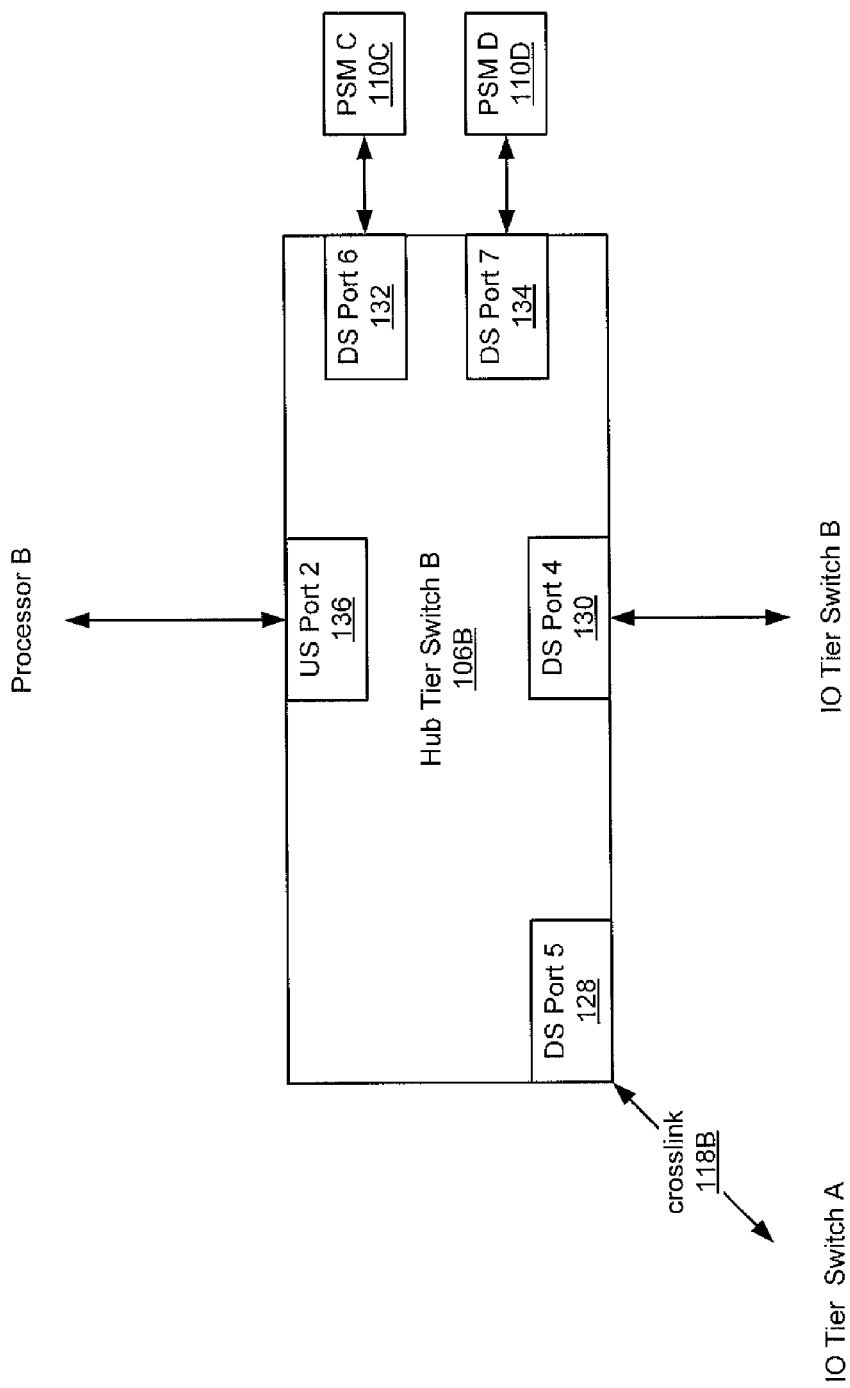
FIG. 3 shows a hub tier switch in accordance with one or more embodiments of the invention.

FIG. 3 shows a hub tier switch in accordance with one or more embodiments of the invention. The HTS (106B) includes one upstream (US) port (US Port 2 (136)) and one or more downstream (DS) ports (DS port 4 (130), DS port 5 (128)), DS port 6 (132), DS port 7 (134)). In one embodiment of the invention, a port is designated as a US port if it points towards the root complex (discussed above). Alternatively, a port is designated as a DS port if it points away from the root complex. In one embodiment a port (either downstream or upstream) is a physical interface between the HTS and a device (e.g., a PSM, a processor, a PCIe switch (e.g., a ITS or a HTS), etc.). The port connects to the device via a link (i.e., a physical connection). If the device is an a different slice than the HTS, then the link is referred to as a crosslink. Further, though shown as single ports in FIG. 3, each of the ports may operate as an egress port, when transmitting TLPs, and as an ingress port when receiving TLPs. Alternatively, the ports shown in FIG. 3 may instead each be implemented as two separate ports—namely, as an ingress port and an egress port.

Continuing with the discussion of FIG. 3, the US port (US Port 2 (136)) is connected, via a link, to a processor (e.g., Processor B in FIG. 3). The US port (136) is also associated with an address range that includes the entire address range of all memory (including all persistent storage and volatile memory in the PSMs in the PCIe fabric) in all slices (104A, 104B in FIG. 1) in the PCIe fabric (100) and the memory (including all persistent storage and volatile memory) of all clients connected to the PCIe fabric. The aforementioned address range does not include the memory (114A, 114B) that is directly attached to the processors (112A, 112B) in the PCIe fabric. The aforementioned address range may be a contiguous address range or may be made up of a series of non-contiguous address ranges.

In one embodiment of the invention, at least one DS port (DS port 5 (128)) is connected, via a crosslink (118B), to an ITS (e.g., IO tier switch A in FIG. 3) in a different slice and is associated with an address range that includes only the memory (including the persistent storage in the corresponding PSMs) associated with that slice (e.g., Slice A in FIG. 3) and the memory (including all persistent storage and volatile memory) of all clients connected to the ITS in that slice (e.g., Slice A in FIG. 3). The aforementioned address range may be a contiguous address range or may be made up of a series of non-contiguous address ranges. More generally, a DS port in a HTS in a first slice that is connected to a second slice via a crosslink in the PCIe fabric is associated with an address range that only includes the memory of the second slice to which it is connected. Depending on the implementation of the PCIe fabric, each HTS may have multiple DS ports, where one or more such DS ports is connected, via crosslink, to an ITS in a different slice.

The HTS also includes DS ports connected to PSMs (110C, 110D). In one embodiment of the invention, each of the DS ports (132, 134) that is connected to a PSM (e.g., PSM C, PSM D) is only associated with an address range for the PSM to which it is connected. In addition, the HTS (108B) includes a DS port (DS port 4 (130)) that is connected to an ITS in the same slice as the HTS.

The HTS (106B) may also implement one or more multicast groups. Depending on the implementation of the PCIe Fabric, each multicast group includes, as subscribers, DS ports associated with one or more PSMs and a US port connected to a processor. For example, one multicast group may include the following subscribers: DS port 6, DS port 7, and US port 2. In another example, the multicast group may include the following subscribers: DS port 6 and DS port 7. The invention is not limited to the aforementioned examples. Each multicast group is associated with a unique multicast address range, which may be distinct from (or is a subset of) the address range associated with the US port (US port 2 (136)), from the address range associated with any of the downstream ports, and any other multicast address range.

FIGS. 4-7 show flowcharts in accordance with one or more embodiments of the invention. While the various steps in the flowchart are presented and described sequentially, one of ordinary skill in the art will appreciate that some or all of the steps may be executed in different orders, may be combined or omitted, and some or all of the steps may be executed in parallel. In one embodiment of the invention, each of the steps shown in FIGS. 4-7 may be performed in parallel with any of the other steps shown in FIGS. 4-7.

Figure 4:
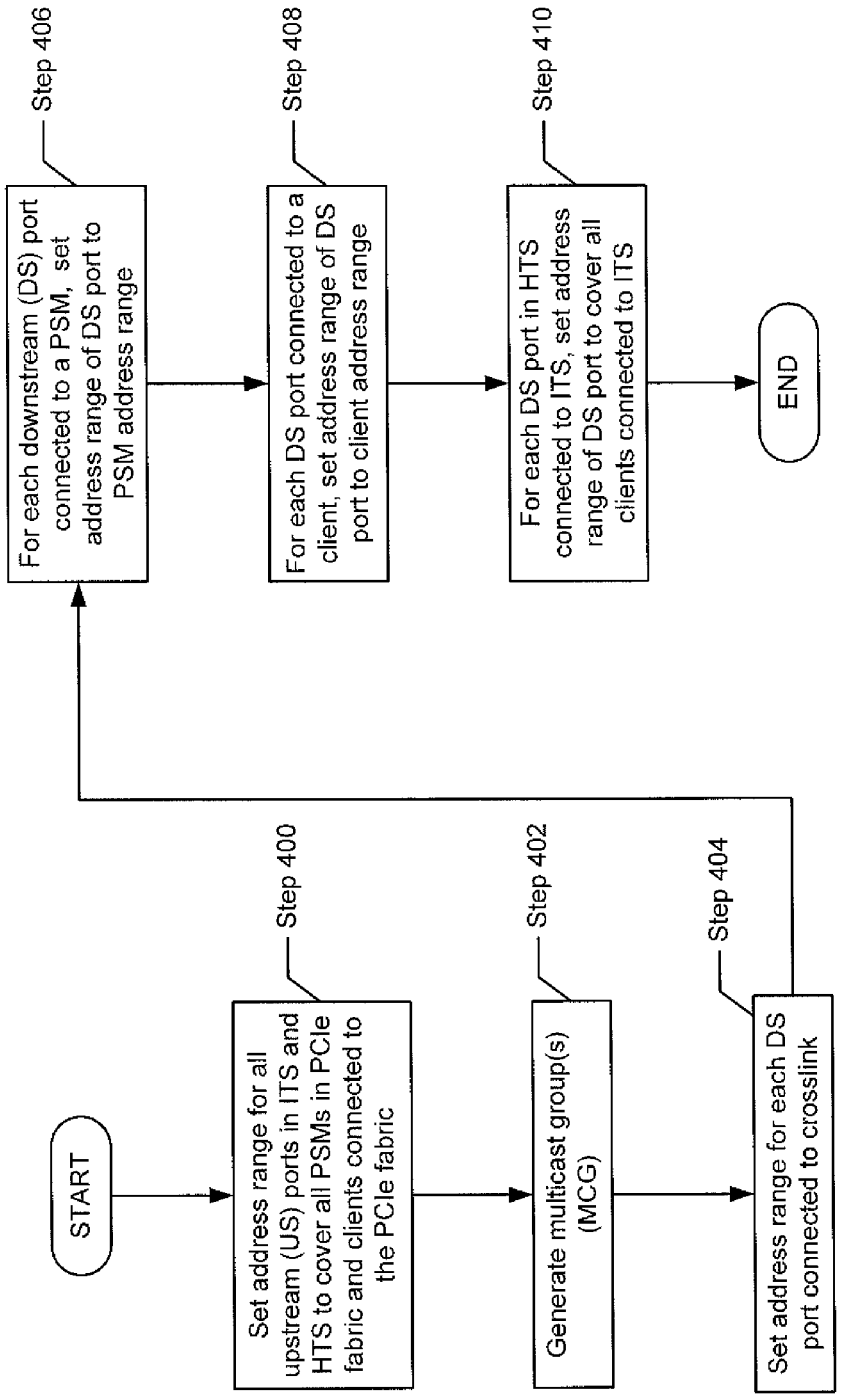
FIG. 4 shows a method for configuring a PCIe Fabric in accordance with one or more embodiments of the invention.

FIG. 4 shows a method for configuring a PCIe Fabric in accordance with one or more embodiments of the invention. In Step 400, the address range associated with each of the upstream ports in all ITSes and HTSes in the PCIe fabric is set to the same address range, i.e., an address range that includes the entire address range of all memory (including all persistent storage and volatile memory in the PSMs in the PCIe fabric) in all slices in the PCIe fabric and the memory (including all persistent storage and volatile memory) of all clients connected to the PCIe fabric. The aforementioned address range may be a contiguous address range or may be made up of a series of non-contiguous address ranges. The aforementioned address range does not include the memory that is directly attached to the processors. In one embodiment of the invention, the aforementioned "address range" may be implemented as a set of address ranges. In one embodiment of the invention, the set of address ranges may include a 32-bit address range(s) and/or a 64-bit address range(s).

In Step 402, one or more multicast groups are generated for the PCIe fabric. The generation of the multicast groups includes (i) specifying a multicast address range for each of the multicast groups and (ii) specifying the subscribers to each of the multicast address groups. As discussed above, each ITS may be associated with at least one multicast address group, where the multicast address group has only one subscriber—the US port in the ITS. Further, as discussed above, the HTS may implement multiple multicast address groups, where the subscribers for each of the multicast groups include a different combination of DS ports (which may be connected to links and/or crosslinks) and/or the US port.

In Step 404, an address range is set for each DS port that is connected to a crosslink, where such DS ports are associated with address ranges that correspond, as discussed above, to the slices to which they are connected. In Step 406, an address range corresponding to a particular PSM is set for each egress DS port that is connected to a PSM. In Step 408, an address range corresponding to a particular client is set for each egress DS port that is connected to a client.

In Step 410, an address range that includes all client memory for all clients connected to an ITS is set for each egress DS port on an HTS that is connected to the ITS. For example, with reference to FIGS. 2 and 3, the address range for egress DS port 4 (130) (i.e., when TLPs are being sent from the HTS to the ITS) is an address range that includes the memory of all clients (102C, 102D) connected to ITS (108B). In one embodiment of the invention, Step 410 may be implemented by setting the address range for a given HTS DS port to equal the address range programmed into the ITS' US port.

Figure 5:
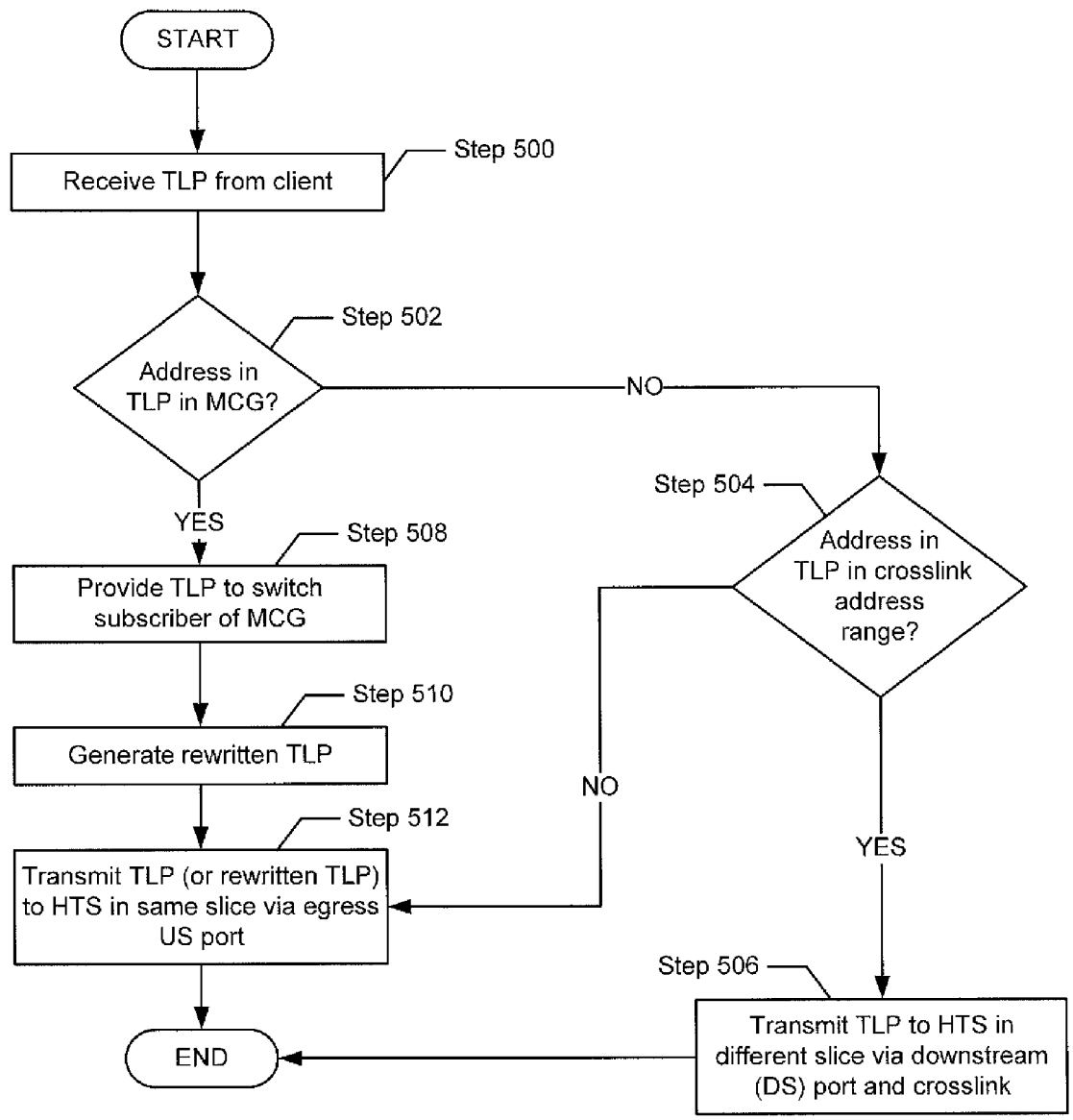
FIG. 5 shows a method for processing transaction layer packets (TLPs) by an IO Tier Switch in accordance with one or more embodiments of the invention.

FIG. 5 shows a method for processing transaction layer packets (TLPs) by an IO Tier Switch in accordance with one or more embodiments of the invention. In Step 500, a TLP is received from a client at an ingress DS port in the ITS, where the TLP is associated with an address and a payload, where the address is used to route the TLP in the PCIe fabric and the payload includes data that is to be stored in a PSM and/or memory or the TLP is associated with an address that is used to route the TLP and that also identifies what starting location of the data to read from the PSM or memory. The TLP may include other information without departing from the invention. In one embodiment of the invention, the client includes a direct memory address (DMA) engine that is configured to generate and issue the TLP to the PCIe fabric.

In Step 502, the ingress DS port makes a determination about whether the address in the TLP is associated with a multicast group (MCG) by determining whether the address in the TLP is associated with a multicast address range. If the address in the TLP is associated with a multicast group, the process proceeds to Step 508; otherwise, the process proceeds to Step 504.

In Step 504, when the address in the TLP is not associated with a multicast group, a determination is made about whether the address in the TLP is in an address range (also referred to as a crosslink address range) that is associated with a DS port that is connected to a crosslink. If the address in the TLP is associated with a crosslink address range, the process proceeds to Step 506; otherwise, the process proceeds to Step 512. In Step 506, the TLP is transmitted, via the appropriate DS port and crosslink, to a HTS in a different slice.

In Step 508, when the address in the TLP is associated with a multicast group, a copy of the TLP is provided to each subscriber of the multicast cast group. In one embodiment of the invention, the US port in the ITS is the only subscriber. Each subscriber, upon receipt of a copy of the TLP, includes functionality to generate a rewritten TLP that includes a new address, where the address in the copy of the TLP is translated to obtain a new address. In Step 510, the address in the TLP is translated to a new address that may or may not be in the multicast address range (i.e., the multicast address range used in Step 502). The result of the translation is a rewritten TLP that includes the new address but the same data payload as the original TLP. In one embodiment of the invention, the new address in the rewritten TLP is the same as the address in the original TLP. In Step 512, either (i) the rewritten TLP from step 510 or (ii) the original TLP from step 504, is transmitted to the HTS via the US port in the ITS, where the HTS is in the same slice as the ITS. In one embodiment of the invention, the original TLP (i.e., the TLP received in step 500) is transmitted to the HTS via the US port in the ITS when the address in the original TLP is not associated with any of the ports in the ITS and is not within the multicast address range.

Figure 6:
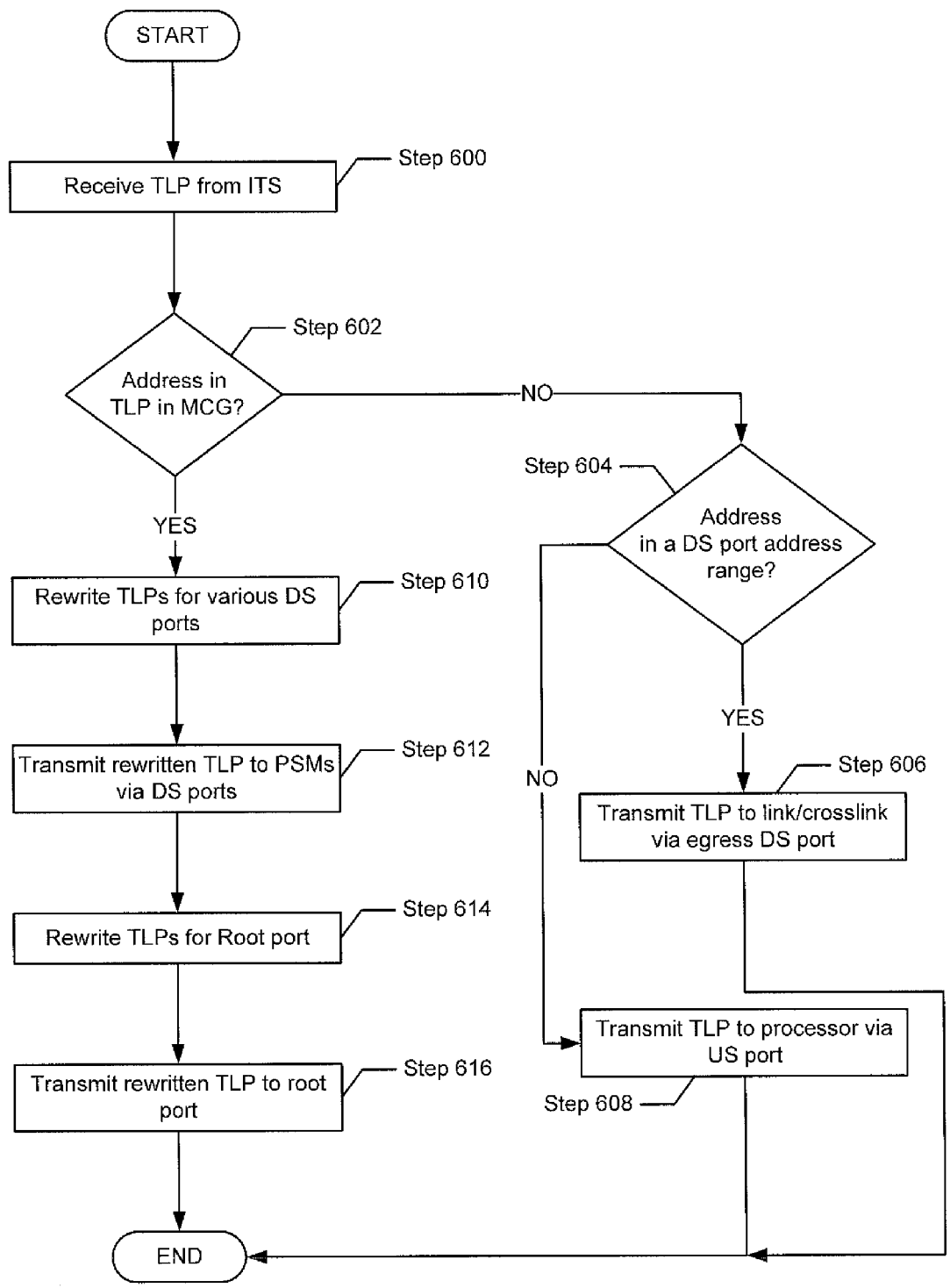
FIG. 6 shows a method for processing TLPs by a hub tier switch in accordance with one or more embodiments of the invention.

FIG. 6 shows a method for processing TLPs by a hub tier switch in accordance with one or more embodiments of the invention.

In Step 600, a TLP is received from a client at an ingress DS port in the HTS, where the TLP is associated with an address and a payload, where the address is used to route the TLP in the PCIe fabric and the payload includes (i) data that is to be stored in a PSM and/or memory or the TLP is associated with an address that is used to route the TLP and that also identifies what starting location of the data to read from the PSM or memory. The TLP may include other information without departing from the invention. The TLP may be received by the ITS in the same slice as the HTS or from an ITS (via a crosslink) in a different slice than the HTS.

In Step 602, the ingress DS port makes a determination about whether the address in the TLP is associated with a multicast group (MCG) by determining whether the address in the TLP is associated with a multicast address range. If the address in the TLP is associated with a multicast group, the process proceeds to Step 610; otherwise, the process proceeds to Step 604. In Step 604, a determination is made about whether the address in the TLP is in a DS port address range. If the address in the TLP is in a DS address port range, the process proceeds to step 606; otherwise the process proceeds to step 608. In step 606, the TLP is transmitted out of a DS egress port that is associated with the address in the TLP. In step 608, the TLP is transmitted (without translating the address in the TLP) to the processor (i.e., processor that is connected to the slice in which the HTS is located) via the US port in the HTS.

In Step 610, when the TLP is associated with a multicast group, a copy of the TLP received in Step 600 is provided to each DS port in the HTS that is a subscriber to the multicast group. Each subscriber, upon receipt of a copy of the TLP, includes functionality to generate a rewritten TLP that includes a new address, where the address in the copy of the TLP is translated to a new address that is associated with the PSM and that is not within any of the multicast address ranges. The result of the aforementioned translations is a set of rewritten TLPs. In Step 612, the rewritten TLPs are transmitted to the appropriate PSMs via the corresponding DS ports in the HTS.

In Step 614, when the TLP is associated with a multicast group and the US port in the HTS is a subscriber, the address in the TLP is translated to a new address that is not within the any of the multicast address ranges. The result of the aforementioned translation is a rewritten TLP. In Step 616, the rewritten TLP is transmitted via the US port to the processor.

In one embodiment of the invention, the PSM, upon receipt of the TLP (via step 606) or the rewritten TLP (via Step 610) from the HTS, either (i) stores the data that is in the payload of the TLP in persistent storage within the PSM or (ii) reads data from a location in the PSM that is specified in the TLP. Further, in one embodiment of the invention, when the processor receives the rewritten TLP from the HTS, the processor stores the data that is in the payload of the TLP in memory that is directly connected to the processor.

Figure 7:
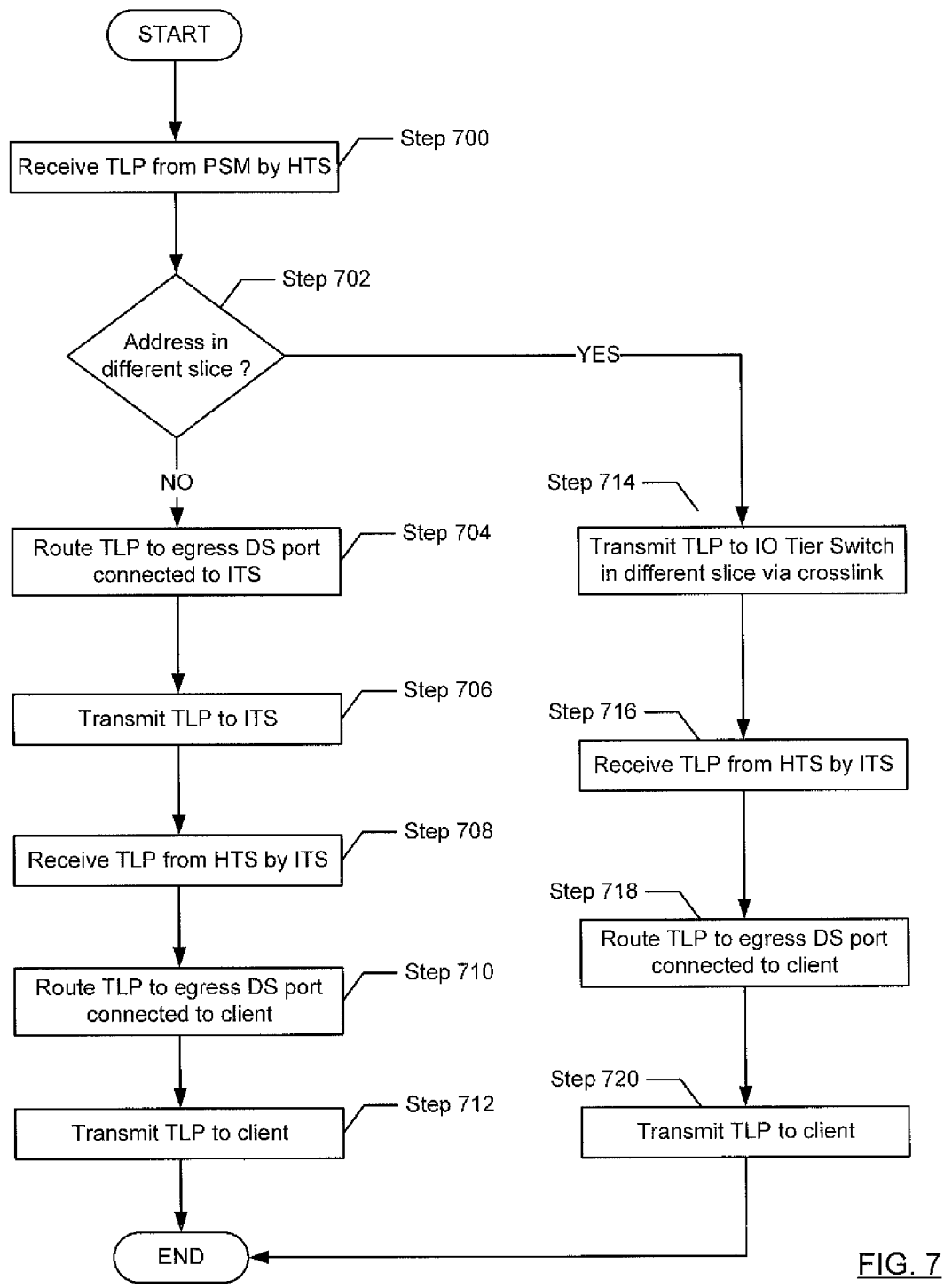
FIG. 7 shows a method for processing TLPs issued by a persistent storage module connected to the PCIe Fabric in accordance with one or more embodiments of the invention.

FIG. 7 shows a method for processing TLPs issued by a PSM connected to the PCIe Fabric in accordance with one or more embodiments of the invention.

In Step 700, a TLP is received by the HTS from a PSM connected to a DS port on the HTS. In one embodiment of the invention, the TLP is associated with an address and a payload, where the address is used to route the TLP in the PCIe fabric and the payload includes data that is to be stored in a client or processor memory or the TLP is associated with an address that is used to route the TLP and that also identifies what starting location of the data to read from the client. The TLP may include other information without departing from the invention. In one embodiment of the invention, the PSM includes a direct memory address (DMA) engine that is configured to generate and issue the TLP to the PCIe fabric.

In Step 702, a determination is made, using the address in the TLP, about whether the TLP is for a client in the same slice as the HTS that received the TLP or for a different slice. The aforementioned determination may be made by determining whether there is a DS port in the HTS that is associated with an address range that includes the address in the TLP. If the address in the TLP is associated with a crosslink address range, the process proceeds to Step 714; otherwise, the process proceeds to Step 704.

In Step 704, when the address is not associated with a crosslink address range, the TLP is routed to the egress DS port (e.g., DS Port 4 (130) in FIG. 3) that is connected to the ITS in the same slice as the PSM that issued the TLP. In Step 706, the TLP is transmitted to the ITS via the egress DS port that is connected to the US port in the ITS. In Step 708, the ITS receives the TLP from the HTS. In Step 710, the TLP is routed to the egress DS port (e.g., DS Port 1 (102C) or DS Port 2 (102D) in FIG. 2) that is associated with a client address range that includes the address in the TLP. In Step 712, the TLP is transmitted to the client via the egress DS port on the ITS that is associated with an address range that includes the address in the TLP.

In Step 714, when the address is associated with a crosslink address range, the TLP is routed to the egress DS port (e.g., DS Port 5 (128) in FIG. 5) that is connected to the ITS in a different slice than the PSM that issued the TLP. In Step 716, the ITS (in a different slice) receives the TLP from the HTS. In Step 718, the TLP is routed to the egress DS port (e.g., DS Port connected via a link to client A or client B in FIG. 2) that is associated with an address range that includes the address in the TLP. In Step 720, the TLP is transmitted to the client via the egress DS port on the ITS that is associated with an address range that includes the address in the TLP.

In one embodiment of the invention, the client, upon receipt of the TLP (via step 712 or step 720) (i) stores the data that is in the payload of the TLP or (ii) reads data from a location in the client memory (or persistent storage) that is specified in the payload of the TLP.

The following section describes examples in accordance with one or more embodiments of the invention; the examples are based on the PCIe fabric shown in FIGS. 1-3. The examples are not intended to limit the scope of the invention.

Example 1

Consider a scenario in which ITS B (108B in FIG. 1) is configured with a first multicast group associated with a first multicast address range that only includes the US Port 1 (126) as a subscriber. Further, HTS B (106B) is configured with a (i) second multicast group associated with a second multicast address group range that includes the following subscribers: DS Port 6 (132) and US Port 2 (136), (ii) a third multicast group associated with a third multicast address group range that includes the following subscribers: DS Port 6 (132), DS Port 7 (134), and (iii) fourth multicast group associated with a fourth multicast address group range that includes the following subscribers: DS Port 5 (128), DS Port 7 (134), and US Port 2 (136).

Consider a scenario in which a TLP with a first address is received by DS Port 1 on ITS B (108B) from client C (102C). Upon receipt by DS Port 1, a determination is made that the first address is within the first multicast address range. Accordingly, the address in the TLP is translated to a new address and then the rewritten TLP is transmitted out of the subscriber port (i.e., US Port 1 in this example) to HTS B.

Upon receipt by DS Port 4 in HTS B, a determination is made that the new address in the rewritten TLP is within the second multicast address range. Accordingly, the new address in the TLP is: (i) translated to a second new address and the resulting rewritten TLP is then transmitted out of the DS port 6 (which is a subscriber to the second multicast group) and (ii) translated to a third new address and the resulting rewritten TLP is then transmitted out of the US port 2 (which is a subscriber to the second multicast group).

Example 2

Consider a scenario in which ITS A (108A in FIG. 1) is configured with a first multicast group associated with a first multicast address range that only includes the US Port associated with HTS A (106A) as a subscriber. Further, HTS A (106A) is configured with a second multicast group associated with a second multicast address group range that includes the following subscribers: DS Port associated with PSM A (110A), the DS Port associated with PSM B (110B), the US Port associated with Processor A (112A) and the DS Port associated with a crosslink to HTS B (106B). In addition, HTS B is configured with a third multicast group associated with a third multicast address group range that includes the following subscribers: DS Port 6 (132) and DS Port 7 (134).

Referring to FIG. 1, consider a scenario in which a TLP with a first address is received by ITS A from client A. Upon receipt by ITS A, a determination is made that the first address is within the first multicast address range. Accordingly, the address in the TLP is translated to a new address and the rewritten TLP is transmitted out of the subscriber port (i.e., a US Port in ITS A) to HTS A.

Upon receipt by HTS A, a determination is made that the new address in the rewritten TLP is within the second multicast address range. Accordingly, the new address in the TLP is: (i) translated to a second new address and the resulting rewritten TLP with the second new address is then transmitted out of the DS port to PSM A (which is a subscriber to the second multicast group), (ii) translated to a third new address and the resulting rewritten TLP with the third new address is then transmitted out of the DS port to PSM B (which is a subscriber to the second multicast group), (iii) translated to a forth new address and the resulting rewritten TLP with the forth new address is then transmitted out of the US port to processor A (which is a subscriber to the second multicast group), and (iv) translated to a fifth new address and the resulting rewritten TLP with the fifth new address is then transmitted out of the DS port to ITS B (via the crosslink) (which is a subscriber to the second multicast group).

Upon receipt by DS Port 5 in HTS B, a determination is made that the fifth address in the rewritten TLP is within the third multicast address range. Accordingly, the new address in the TLP received by DS Port 5 is: (i) translated to a sixth new address and the resulting rewritten TLP is then transmitted out of the DS port 6 (which is a subscriber to the third multicast group) and (ii) translated to a seventh new address and the resulting rewritten TLP is then transmitted out of the DS port 7 (which is a subscriber to the third multicast group).

Example 3

Consider a scenario in which there is a crosslink between ITS A and HTS A (not shown in FIG. 1). Further, HTS A (106A) is configured with a multicast group associated with a multicast address group range that includes the following subscribers: DS Port associated with PSM A (110A), the DS Port associated with PSM B (110B), and the US Port associated with Processor A (112A).

Referring to FIG. 1, consider a scenario in which a TLP with a first address is received by ITS A from client A. Upon receipt by ITS A, a determination is made that the first address is associated with the DS port that is associated with the crosslink between ITS A and HTS B. The TLP is subsequently transmitted to HTS A via the crosslink between ITS A and HTS A.

Upon receipt by HTS A, a determination is made that the address in the rewritten TLP is within a multicast address range. Accordingly, the address in the TLP is: (i) translated to a first new address and the resulting new TLP with the first new address is then transmitted out of the DS port to PSM A (which is a subscriber to the multicast group), (ii) translated to a second new address and the resulting new TLP with the second new address is then transmitted out of the DS port to PSM B (which is a subscriber to the second multicast group), and (iii) translated to a third new address and the resulting new TLP with the third new address is then transmitted out of the US port to processor A (which is a subscriber to the second multicast group).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A PCIe Fabric comprising:
an Input/Output (I/O) tier comprising a first IO tier switch and a second IO tier switch;
a hub tier comprising a plurality of hub tier switches, wherein the plurality of hub tier switches comprises a first hub tier switch and a second hub tier switch, wherein the first IO tier switch is connected to the first hub tier switch using a first link, wherein the first IO tier switch is connected to second hub tier switch using a crosslink;
a plurality of target devices, wherein each of the plurality of target devices is connected to one of the plurality of hub tier switches, wherein the first hub tier switch is connected to a first target device of the plurality of target devices using a second link, and wherein the first hub tier switch is connected to a second target device of the plurality of target devices using a third link;
wherein the first IO tier switch is configured to:
  receive, from a client, a transaction layer packet (TLP);
  make a first determination that an address in the TLP is not associated with any multicast address range in the first IO tier switch;
  make a second determination that the address in TLP is not associated with any downstream port in the first IO tier switch;
  based on the first and second determinations, route the TLP to the first hub tier switch using the first link via a first upstream port on the first IO tier switch;
wherein the first hub tier switch is configured to:
  receive, from the first IO tier switch, the TLP at a first downstream port;
  make a third determination that the TLP is associated with a first multicast group;
  based on the third determination:
    generate a first rewritten TLP and route the first rewritten TLP to the first target device using the second link via a second downstream port on the first hub tier switch, wherein the second downstream port is a subscriber of the first multicast group.

2. The PCIe fabric of claim 1, wherein the first hub tier switch is further configured to:
generate a second rewritten TLP and route the second rewritten TLP to the first target device using the third link via a third downstream port on the first hub tier switch, wherein the third downstream port is a subscriber of the first multicast group.

3. The PCIe fabric of claim 1, further comprising:
a processor, wherein the processor is connected to the first hub tier switch using a fourth link, wherein the fourth link is between a second upstream port on the hub tier switch and a root port on the processor,
wherein the root port is associated with the second multicast group,
wherein the first hub tier switch is further configured to:
  based on the third determination, generate a third rewritten TLP and route the third rewritten TLP to the processor using the third link via the second upstream port on the first hub tier switch, wherein the second upstream port is a subscriber of the first multicast group.

4. The PCIe fabric of claim 3, further comprising:
a second processor, wherein the processor and the second processor are operatively connected via a processor interconnect.

5. The PCIe Fabric of claim 1,
wherein the first IO tier switch is further configured to:
  receive, from the client, a second TLP;
  make a fourth determination that the second TLP comprises an address that is within an address range associated with a third downstream port on the first IO tier switch;
  based on the fourth determination, route the second TLP to the second hub tier switch using the crosslink via the third downstream port;
wherein the second hub tier switch is configured to:
  receive, from the first IO tier switch, the second TLP at a fourth downstream port;
  make a fifth determination that the second TLP is associated with the target device directly connected to the second hub tier switch;
  based on the fifth determination, route the second TLP to the target device directly connected to the second hub tier switch.

6. The PCIe Fabric of claim 1,
wherein the first IO tier switch is further configured to:
  receive, from the client, a second TLP;
  make a fourth determination that the second TLP comprises an address that is within an address range associated with a third downstream port on the first IO tier switch;
  based on the fourth determination, route the second TLP to the second hub tier switch using the crosslink via the third downstream port;
wherein the second hub tier switch is configured to:
  receive, from the first IO tier switch, the second TLP at a fourth downstream port;
  make a fifth determination that the second TLP is associated a second multicast group:
  based on the fifth determination, generate a third rewritten TLP and route the third rewritten TLP to a third target device using a fourth link via a fifth downstream port on the second hub tier switch, wherein the fifth downstream port is a subscriber of the second multicast group, and wherein the third target device is connected to the second hub tier switch via the fourth link.

7. The PCIe Fabric of claim 1,
wherein the first IO tier switch is further configured to:
  receive, from the client, a second TLP;

make a third determination that the second TLP is associated with the first multicast group;
based on the third determination, generate a second rewritten TLP and route the second rewritten TLP to the first hub tier switch using the first link;
wherein the first hub tier switch is configured to:
receive, from the first IO tier switch, the second rewritten TLP at the first downstream port;
make a fifth determination that the second rewritten TLP is associated with the target device directly connected to the first hub tier switch;
based on the fifth determination, route the second rewritten TLP to the target device directly connected to the second hub tier switch.

8. The PCIe fabric of claim 1, wherein the first upstream port on the first IO tier switch is associated with a first address range that includes all memory in the PCIe fabric excluding memory directly connected to the processor and a second address range that includes all memory associated with clients connected to the PCIe fabric, wherein the first address range and the second address range are used to route TLP packets received by the first IO tier switch.

9. The PCIe fabric of claim 8, wherein all the memory associated with the clients comprises at least one selected from a group consisting of persistent storage and volatile memory.

10. The PCIe fabric of claim 8, wherein all the memory in the PCIe fabric comprises at least one selected from a group consisting of persistent storage and volatile memory.

11. The PCIe fabric of claim 1, wherein the second upstream port on the first hub tier switch is associated with a first address range that includes all memory in all slices in the PCIe fabric and a second address range that includes all memory associated with clients connected to the PCIe fabric, wherein the first IO tier switch and the first hub tier switch are in a first slice of the slices in the PCIe fabric, wherein the first slice excludes memory directly connected to the processor and excludes any of the plurality of the target devices that are not directly connected to the first hub tier switch, wherein the first address range and the second address range are used to route TLP packets received by the first IO tier switch.

12. The PCIe fabric of claim 1, wherein the crosslink connects a third downstream port of the first IO tier switch and a downstream port of the second hub tier switch.

13. The PCIe fabric of claim 12, wherein the third downstream port of the first IO tier is associated with an address range that includes memory in a slice of the PCIe fabric, wherein the memory in the slice of the PCIe fabric includes the plurality of the target devices that are directly connected to the second hub tier switch and excludes any of the plurality of the target devices that are directly connected to the first hub tier switch.

14. The PCIe fabric of claim 1, wherein at least one of the plurality of target devices comprises at least one selected from a group consisting of volatile memory and persistent storage.

15. The PCIe fabric of claim 1, wherein at least one of the plurality of target devices comprises NAND flash.

16. The PCIe fabric of claim 1, wherein at least one of the plurality of target devices is one selected from a group consisting of a network endpoint device and a storage endpoint device.

17. The PCIe fabric of claim 1, wherein the client is a PCIe endpoint.

18. The PCIe fabric of claim 1, wherein the first IO tier switch and the first hub tier switch are connected using a second crosslink.

19. The PCIe fabric of claim 18, wherein the first IO tier switch is configured to route TLPs to the first hub tier switch using the second crosslink.

20. The PCIe fabric of claim 18, wherein the second crosslink is not associated with any multicast group.

21. The PCIe fabric of claim 18, wherein the second crosslink is connected to a first downstream port on the first IO tier switch and a third downstream port on the first hub tier switch.

22. A PCIe Fabric comprising:
an Input/Output (I/O) tier comprising a first IO tier switch and a second IO tier switch;
a hub tier comprising a plurality of hub tier switches, wherein the plurality of hub tier switches comprises a first hub tier switch and a second hub tier switch, wherein the first IO tier switch is connected to the first hub tier switch using a first link, wherein the first IO tier switch is connected to second hub tier switch using a crosslink;
wherein the PCIe fabric is operatively connected to a plurality of target devices, wherein each of the plurality of target devices is connected to one of the plurality of hub tier switches, wherein the first hub tier switch is connected to a first target device of the plurality of target devices using a second link, and wherein the first hub tier switch is connected to a second target device of the plurality of target devices using a third link;
wherein the first IO tier switch is configured to:
receive, from a client, a transaction layer packet (TLP);
make a first determination that an address in the TLP is not associated with any multicast address range in the first IO tier switch;
make a second determination that the address in TLP is not associated with any downstream port in the first IO tier switch;
based on the first and second determinations, route the TLP to the first hub tier switch using the first link via a first upstream port on the first IO tier switch;
wherein the first hub tier switch is configured to:
receive, from the first IO tier switch, the TLP at a first downstream port;
make a third determination that the TLP is associated with a first multicast group;
based on the third determination:
generate a first rewritten TLP and route the first rewritten TLP to the first target device using the second link via a second downstream port on the first hub tier switch, wherein the second downstream port is a subscriber of the first multicast group.

23. The PCIe Fabric of claim 22,
wherein the first IO tier switch is further configured to:
receive, from the client, a second TLP;
make a fourth determination that the second TLP comprises an address that is within an address range associated with a third downstream port on the first IO tier switch;
based on the fourth determination, route the second TLP to the second hub tier switch using the crosslink via the third downstream port;
wherein the second hub tier switch is configured to:
receive, from the first IO tier switch, the second TLP at a fourth downstream port;
make a fifth determination that the second TLP is associated with the target device directly connected to the second hub tier switch;

based on the fifth determination, route the second TLP to the target device directly connected to the second hub tier switch.

24. The PCIe Fabric of claim 22,
wherein the first IO tier switch is further configured to:
  receive, from the client, a second TLP;
  make a fourth determination that the second TLP comprises an address that is within an address range associated with a third downstream port on the first IO tier switch;
  based on the fourth determination, route the second TLP to the second hub tier switch using the crosslink via the third downstream port;
wherein the second hub tier switch is configured to:
  receive, from the first IO tier switch, the second TLP at a fourth downstream port;
  make a fifth determination that the second TLP is associated a second multicast group:
  based on the fifth determination, generate a third rewritten TLP and route the third rewritten TLP to a third target device using a fourth link via a fifth downstream port on the second hub tier switch, wherein the fifth downstream port is a subscriber of the second multicast group, and wherein the third target device is connected to the second hub tier switch via the fourth link.

25. The PCIe Fabric of claim 22,
wherein the first IO tier switch is further configured to:
  receive, from the client, a second TLP;
  make a third determination that the second TLP is associated with the first multicast group;
  based on the third determination, generate a second rewritten TLP and route the second rewritten TLP to the first hub tier switch using the first link;
wherein the first hub tier switch is configured to:
  receive, from the first IO tier switch, the second rewritten TLP at the first downstream port;
  make a fifth determination that the second rewritten TLP is associated with the target device directly connected to the first hub tier switch;
  based on the fifth determination, route the second rewritten TLP to the target device directly connected to the second hub tier switch.

\* \* \* \* \*